United States Patent [19]
Alarcon

[11] Patent Number: 6,019,064
[45] Date of Patent: Feb. 1, 2000

[54] ANIMAL OBSERVATION SYSTEM

[76] Inventor: Henry Alarcon, 773 E. Sixth St., Pomona, Calif. 91766

[21] Appl. No.: 09/229,418

[22] Filed: Jan. 12, 1999

Related U.S. Application Data

[63] Continuation-in-part of application No. 08/812,908, Mar. 10, 1997, abandoned.

[51] Int. Cl.[7] ................................................... A01K 63/00
[52] U.S. Cl. ........................................... 119/247; 119/250
[58] Field of Search .................................. 119/245, 247, 119/249, 250, 251, 452, 472

[56] References Cited

U.S. PATENT DOCUMENTS

| | | | |
|---|---|---|---|
| 192,595 | 7/1877 | Palen et al. | 119/250 |
| 3,921,583 | 11/1975 | De Shores | 119/250 |
| 3,991,715 | 11/1976 | Gibson, Jr. | 119/249 |
| 5,009,188 | 4/1991 | Yasui | 119/245 |
| 5,230,298 | 7/1993 | Pearce | 119/250 |
| 5,634,433 | 6/1997 | Schmitt | 119/250 |
| 5,664,524 | 9/1997 | Piglia et al. | 119/452 |
| 5,693,220 | 12/1997 | Sceusa | 119/247 |

*Primary Examiner*—Peter M. Poon
*Assistant Examiner*—Elizabeth Shaw
*Attorney, Agent, or Firm*—Robert T. Spaulding

[57] ABSTRACT

An animal observation system comprising two enclosures, each configured to provide a habitant for air-breathing animals. A cylindrically shaped gallery connects the enclosures. A section of the gallery is transparent and waterproof. Also included is a fish tank in which the transparent section is embedded. The transparent section spans the space within the tank so that air-breathing animals occupying the transparent section appear to be intermingling with aquatic life within the fish tank. Feeding stations are provided for the air-breathing animals to entice them into the transparent section.

11 Claims, 2 Drawing Sheets

ANIMAL OBSERVATION SYSTEM

This application is a continuation-in-part of application Ser. No. 08/812,908 filed Mar. 10, 1997 now abandoned.

BACKGROUND OF THE INVENTION

1) Field of the invention.

This invention relates generally to animal enclosures found in the home such as hamster cages and fish aquariums, and more specifically to an observation system that combines an air-breathing animal enclosure or habitant with a fish tank so that the animals appear to co-exist in the same environment.

2) Description of the prior art

Several aquatic amusement parks feature walk-through water tanks that provide a unique perspective of aquatic life to an observer. U.S. Pat. No. 5,009,188 shows such an arrangement. However, there are no situations wherein an observer may simultaneously view air-breathing animals and marine life.

Accordingly, one object and advantage of this invention is to provide an environment in which small air-breathing animals contained within a transparent gallery are perceived to be intermingled with aquatic animals.

Another object and advantage of this invention is that the observer need not move about to enjoy the activities of all animals.

Another object and advantage is that the feeding activities of all animals may be observed.

Further objects and advantages of this invention will become apparent from consideration of the drawings and ensuing description of it.

SUMMARY OF THE INVENTION

The present invention comprises two enclosures; each configured to provide a comfortable and sanitary habitant for air-breathing animals. A cylindrically shaped gallery connects the enclosures. A section of the gallery is transparent and waterproof. The non-transparent sections of the gallery are perforated to facilitate airflow.

The present invention further includes a fish tank having a plurality of vertical surfaces, a top and a bottom containing water therein and in which the transparent section is horizontally embedded. The transparent section spans the space within the tank so that air-breathing animals occupying the transparent section appear to be intermingling with aquatic life contained within the fish tank. In addition, the transparent section is located at the midpoint of two vertical surfaces of the tank to provide optimum viewing. The juncture is sealed to ensure watertight integrity.

Two feeding stations for the air-breathing animals are provided. They are located one at each end of the transparent section and attach to a vertical surface of the fish tank for convenient servicing. A component of the feeding station, henceforth called a feeding device may be configured to contain either liquids or solids. These feeding stations are visible to the observer, thereby enhancing the viewing experience.

DESCRIPTION OF THE PREFERRED EMBODIMENT

Figure 1:
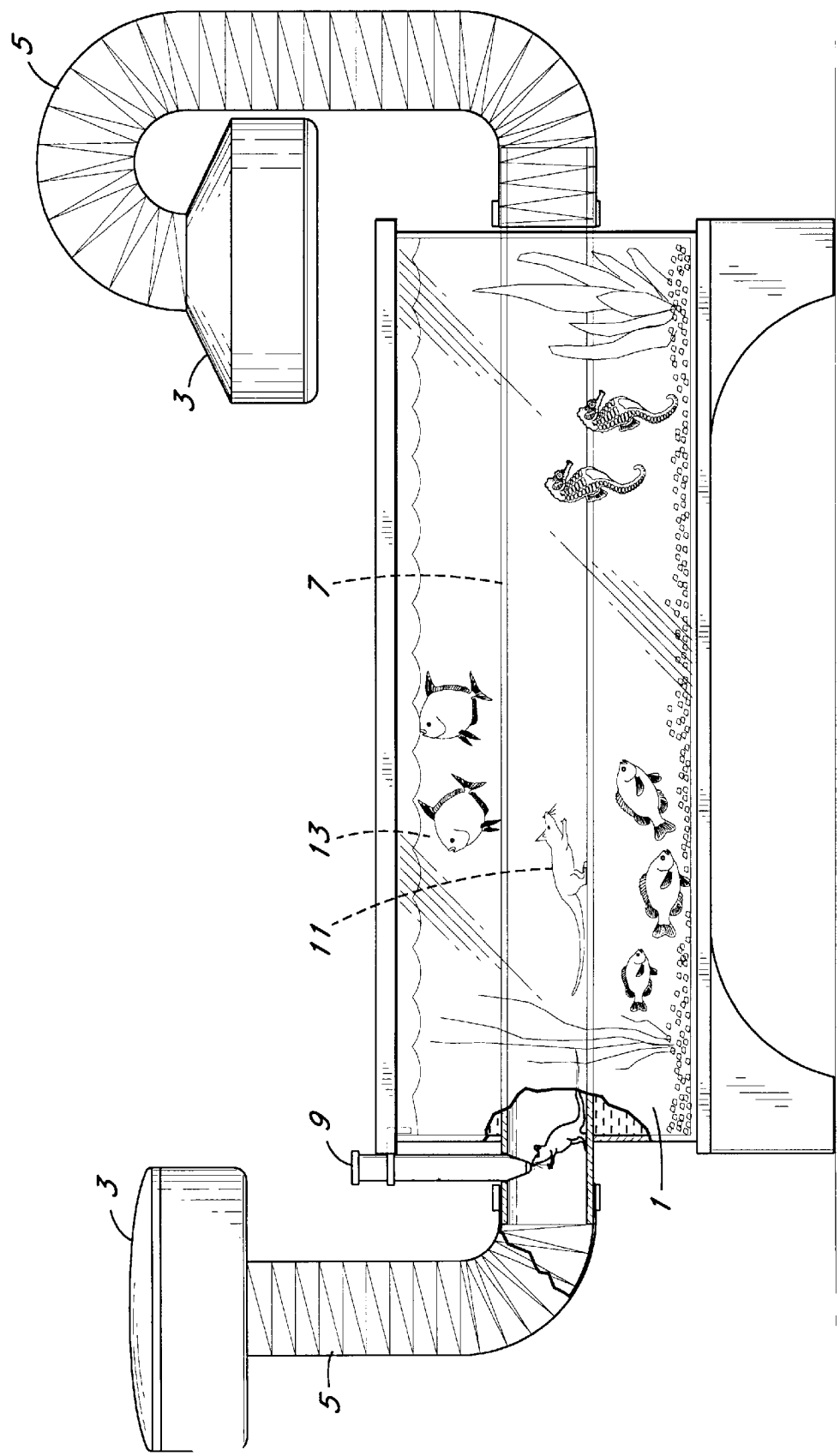
FIG. 1 shows a frontal view of the animal observation system. In this view, the relationship between the fish tank 1, the enclosures 3, the non-transparent sections of the gallery 5, the centrally located transparent section of the gallery 7, and a feeding device 9 may be clearly seen. In addition, the interaction between air-breathing animals 11 and aquatic animals 13 is demon started.

FIG. 1 shows two enclosures 3, each configured as a habitant for air-breathing animals 11. A cylindrically shaped gallery comprised of non-transparent sections 5 and a centrally located transparent section 7 conjoins the enclosures. The gallery permits air-breathing animals to migrate from one enclosure to the other. The transparent section of the gallery is horizontally embedded within a fish tank 1 which is comprised of a plurality of vertical surfaces, a top, a bottom, and a lid and contains water therein. For optimal viewing, the transparent section is located midway to both the top and bottom of the tank. In this view, the symbiotic relationship between aquatic animals 13 and air-breathing animals may be clearly seen.

Figure 2:
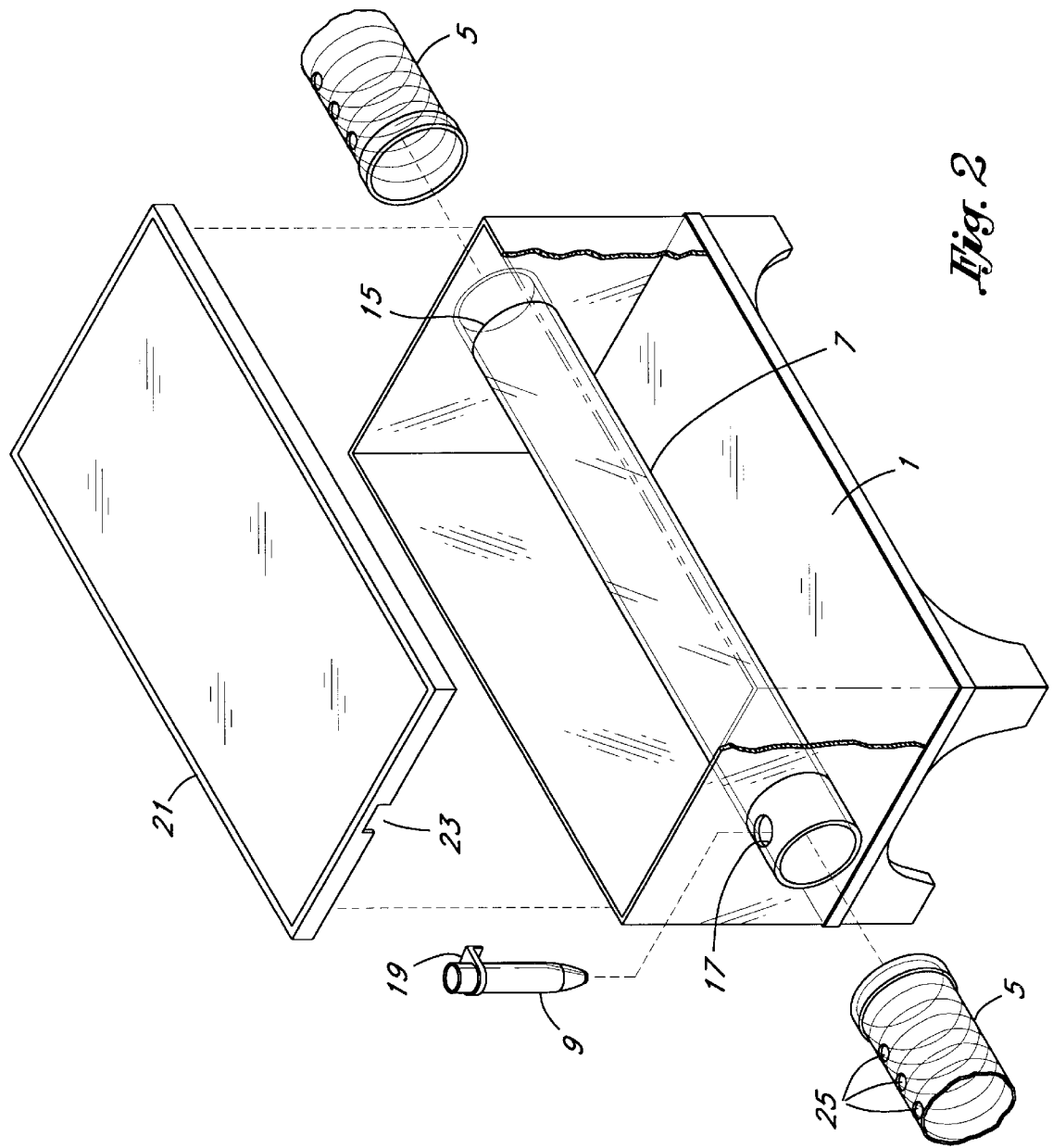
FIG. 2 shows a cutaway perspective view of the fish tank 1, the non-transparent sections of the gallery 5, the transparent section of the gallery 7, a feeding device 9, an aperture 17, a feeding device attachment 19, the lid of the fish tank 21, a notch in the fish tank lid 23, and typical perforations in the non-transparent section of the gallery 25.

FIG. 2 shows the manner in which the transparent section 7 is embedded within and extends through two cylindrically shaped apertures 15 located on the sides of the fish tank 1. The transparent section is fixed in place with a sealant, forming a watertight junction.

A feeding station has been dismantled to display individual components, which consist of an aperture 17 located on the upper surface of a portion of the transparent section that extends from the outside surface of the fish tank, a feeding device 9, and a mounting tab 19. In this view, the feeding device is shown to be cylindrically shaped and contains liquids. Another embodiment, not shown, consists of a rectangularly shaped aperture and feeding device containing pellets and the like.

All feeding devices have a mounting tab positioned so that when a feeding device is presented to an aperture, the mounting tab slides over a vertical surface of the fish tank. A notch 23 in the fish tank lid 21 cooperates with the mounting tab to secure the feeding device in place. In this manner, a feeding station located at one end of the transparent section may dispense liquids while a feeding station located at the other end of the transparent section may dispense solids. An observer may see both feeding stations.

Also shown in this view are a series of perforations 25 arranged along the upper surfaces of the non-transparent sections 5 of the gallery. These perforations ensure air circulation throughout the gallery.

Based on the description of FIGS. 1 and 2, it can be seen that this invention provides an animal observation system whereby small air-breathing animals appear to be intermingled with aquatic animals.

Although the description above contains many specifications, these should not be construed as limiting the scope of the invention, but as merely providing illustrations of some of the presently preferred embodiments of this invention. For example, the fish tank could be hexagonal in shape; the transparent section of the gallery could be square, etc.

I claim:

1. An animal observation system comprised of a fish tank including a plurality of vertical surfaces, a top, a bottom, and a lid and containing water therein for displaying aquatic animals therein and two enclosures each configured as a habitant for air-breathing animals contained therein in which said enclosures are conjoined by a cylindrically shaped gallery, said gallery comprised of two non-transparent sections and a centrally located transparent section that is horizontally embedded within said fish tank so that an observer may simultaneously view air-breathing and aquatic animals.

2. The animal observation system of claim 1, in which the transparent section is located at the midpoint of two vertical surfaces of the fish tank and sealed therein to provide a watertight junction.

3. The animal observation system of claim 1, further including two feeding stations located one at each end of the centrally located transparent section of the gallery.

4. The animal observation system of claim 3, further including a feeding device having a mounting tab positioned to slide over a vertical surface of the fish tank and secured in that manner by a notch in the fish tank lid.

5. The animal observation system of claim 4, in which said device may be configured to contain either liquids or solids.

6. The animal observation system of claim 1, further including a series of perforations arranged along the upper surfaces of said sections to ensure air circulation.

7. An animal observation system comprising:

an enclosure dimensioned to provide a habitant for air-breathing animals contained therein conjoined with a similarly dimensioned enclosure by a cylindrically shaped gallery wherein said animals may range from one enclosure to the other, said gallery comprised of a non-transparent section, a waterproof centrally located transparent section, and a second nontransparent section;

a fish tank comprised of a plurality of vertical surfaces, a top, a bottom, and a lid; having water therein and dimensioned to provide a habitant for aquatic animals contained therein, said tank including two vertical surfaces each with a cylindrically shaped aperture dimensioned to admit said transparent section located midway to both the top and bottom of the tank and coaxially aligned to accommodate the transparent section of the gallery which is of sufficient length to span the distance between said vertical surfaces so that a watertight junction is formed between each side and the transparent section, thus allowing simultaneous observation of aquatic animals in the fish tank and air-breathing animals in the transparent section of the gallery.

8. The animal observation system of claim 7, further including two feeding stations positioned at each end of the transparent section of the gallery outside of the fish tank and so aligned that an observer may view them.

9. The animal observation system of claim 8, further including a feeding device having a mounting tab positioned to slide over a vertical surface of the fish tank and secured in that manner by a notch in the fish tank lid.

10. The animal observation system of claim 9, in which said device may be configured to contain either liquids or solids.

11. The animal observation system of claim 7 further including a series of perforations in the nontransparent sections of the gallery to facilitate airflow.

\* \* \* \* \*